US008855641B2

(12) United States Patent
Kumar Reddy et al.

(10) Patent No.: US 8,855,641 B2
(45) Date of Patent: Oct. 7, 2014

(54) WIRELESS COMMUNICATION DEVICE CAPABLE OF EFFICIENT RADIO ACCESS TECHNOLOGY MEASUREMENTS

(75) Inventors: C. Ashok Kumar Reddy, Bangalore (IN); Shashidhar Vummintala, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 76 days.

(21) Appl. No.: 13/341,686

(22) Filed: Dec. 30, 2011

(65) Prior Publication Data

US 2013/0130687 A1    May 23, 2013

Related U.S. Application Data

(60) Provisional application No. 61/562,196, filed on Nov. 21, 2011.

(51) Int. Cl.
*H04W 88/02* (2009.01)
*H04W 36/08* (2009.01)

(52) U.S. Cl.
CPC .................................. *H04W 36/08* (2013.01)
USPC ........................................................ 455/436

(58) Field of Classification Search
USPC ........................................................ 455/436
See application file for complete search history.

(56) References Cited

U.S. PATENT DOCUMENTS

| | | | |
|---|---|---|---|
| 2007/0097914 A1* | 5/2007 | Grilli et al. ..................... | 370/329 |
| 2010/0128825 A1* | 5/2010 | Lindoff et al. ................ | 375/344 |
| 2010/0260147 A1* | 10/2010 | Xing et al. .................... | 370/332 |
| 2011/0021158 A1* | 1/2011 | Xing et al. ....................... | 455/68 |
| 2011/0183670 A1* | 7/2011 | Wu ............................. | 455/435.1 |
| 2012/0188877 A1* | 7/2012 | Chin et al. .................... | 370/241 |
| 2013/0148530 A1* | 6/2013 | Di Girolamo et al. ......... | 370/252 |
| 2013/0244719 A1* | 9/2013 | Nukala et al. .............. | 455/550.1 |
| 2013/0258883 A1* | 10/2013 | Vargas Bautista et al. ... | 370/252 |

\* cited by examiner

*Primary Examiner* — Diane Mizrahi

(74) *Attorney, Agent, or Firm* — Sterne, Kessler, Goldstein & Fox PLLC

(57) ABSTRACT

A wireless communication device is disclosed that is capable of performing efficient measurements of secondary radio access technologies (RATs). The device includes multiple receiver chains. While operating in a first RAT, the device receives a measurement gap in order to perform measurements. Even though the measurement gap may be too small to adequately measure the other RAT, the device controls one of the receiver chains to measure the other RAT during a time period that overlaps with the measurement gap. In addition, when preparing for an inter-RAT handoff, the device controls one of the receiver chains to perform measurements regardless of whether a measurement gap has been received. In this manner, measurements of alternative RATs are efficiently performed, and handoff latency is significantly reduced.

14 Claims, 4 Drawing Sheets

US 8,855,641 B2

WIRELESS COMMUNICATION DEVICE CAPABLE OF EFFICIENT RADIO ACCESS TECHNOLOGY MEASUREMENTS

CROSS-REFERENCED TO RELATED APPLICATIONS

This patent application claims the benefit of U.S. Provisional Patent Application No. 61/562,196, filed Nov. 21, 2011, entitled "Fourth Generation (4G) Communication System," which is incorporated herein by reference in its entirety.

BACKGROUND

1. Field of Invention

The invention relates to wireless communications, and more specifically to a wireless communication device that is capable of efficiently measuring a secondary radio access technology.

2. Related Art

Wireless communication devices, such as cellular telephones to provide an example, are becoming commonplace in both personal and commercial settings. The wireless communication devices provide users with access to all kinds of information, as well as the ability to communicate with other such devices across large distances. For example, a user can access the internet through an internet browser on the device, download miniature applications (e.g., "apps") from a digital marketplace, send and receive emails, or make telephone calls using a voice over internet protocol (VoIP). Consequently, wireless communication devices provide users with significant mobility, while allowing them to remain "connected" to communication channels and information.

Wireless communication devices communicate with one or more other wireless communication devices or wireless access points to send and receive data. Typically, a first wireless communication device generates and transmits a radio frequency signal modulated with encoded information. This radio frequency signal is transmitted into a wireless environment and is received by a second wireless communication device. The second wireless communication device demodulates and decodes the received signal to obtain the information. The second wireless communication device may then respond in a similar manner. The wireless communication devices can communicate with each other or with access points using any well-known modulation scheme, including simple amplitude modulation (AM), simple frequency modulation (FM), quadrature amplitude modulation (QAM), phase shift keying (PSK), quadrature phase shift keying (QPSK), and/or orthogonal frequency-division multiplexing (OFDM), as well as any other communication scheme that is now, or will be, known.

Different wireless communication devices may communicate using any one of different radio access technologies (RATs), including WiMAX, LTE, 4G, 3G, 2G, and WiFi, among others. Some devices are capable of communicating using multiple different RATs. At any given time, a multi-RAT device can be currently communicating using a primary RAT, while measuring signals from one or more secondary RATs that the device is not currently utilizing, but may utilize in the future if conditions warrant. The measurements for the secondary RAT occur only during time periods allocated for measurement gaps that are provided by the primary RAT.

As a result of this measurement scheme, the performance of current devices suffers. Specifically, measurement gaps provided for the primary RAT may be insufficient to measure the secondary RATs. For example, 2G measurement gaps are approximately 4.6 ms. However, 4G measurements typically require 5-6 ms. As a result, in order to perform the 4G measurement, current devices must ignore several of the incoming 2G packets that follow the 2G measurement gap in order to complete the 4G measurement. This can result in erroneous signals and/or reduced throughput through retransmission of the ignored signal.

In addition, when performing a handoff from the primary RAT to a secondary RAT, typical devices must again acquire the measurements from the secondary RAT. This handoff measurement is performed after communications with the primary RAT have ceased, which significantly adds to handoff preparation time, and therefore increases handoff latency.

Consequently, there is a need for a wireless communication device capable of efficiently performing measurements of secondary RATs. Further aspects and advantages of the invention will become apparent from the detailed description that follows.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

Figure 1:
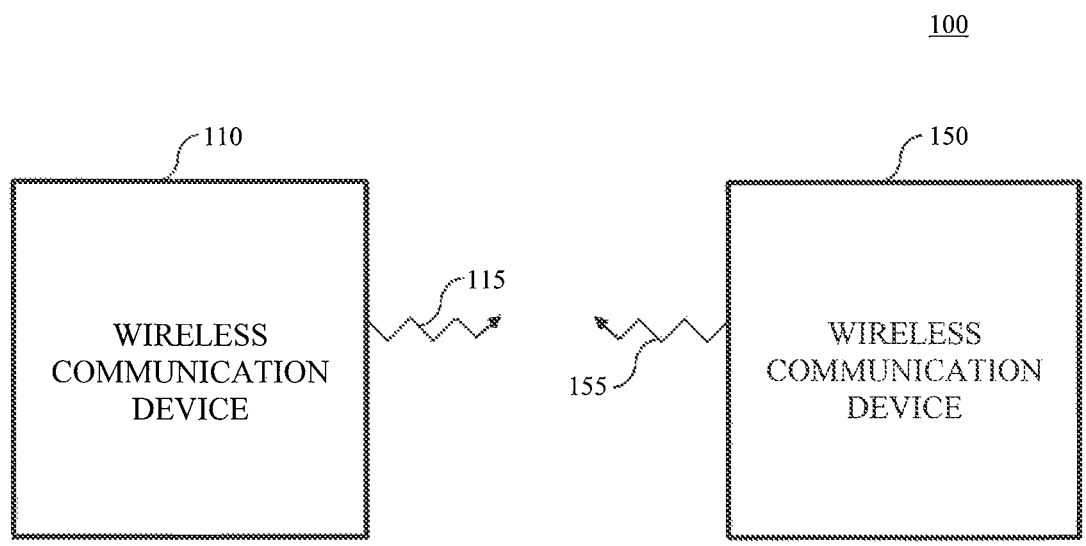
FIG. 1 illustrates a block diagram of a wireless communication environment according to an exemplary embodiment of the invention.

The invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware (e.g., circuits), firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the description of the present invention is to be described in terms of wireless communication (specifically cellular communication), those skilled in the relevant art(s) will recognize that the present invention may be applicable to other communications that use wired or other wireless communication methods without departing from the spirit and scope of the present invention.

An Exemplary Wireless Communications Environment

FIG. 1 illustrates a block diagram of a wireless communication environment 100 according to an exemplary embodiment of the invention. The wireless communication environment 100 provides wireless communication of information, such as one or more commands and/or data, between wireless communication devices. The wireless communication devices may each be implemented as a standalone or a discrete device, such as a mobile telephone, or may be incorporated within or coupled to another electrical device or host device, such as a portable computing device, a camera, or a Global Positioning System (GPS) unit or another computing device such as a personal digital assistant, a video gaming device, a laptop, a desktop computer, or a tablet, a computer peripheral such as a printer or a portable audio and/or video player to provide some examples and/or any other suitable electronic device that will be apparent to those skilled in the relevant art(s) without departing from the spirit and scope of the invention.

The exemplary wireless communication environment 100 includes a first wireless communication device 110 and a second wireless communication device 150. The first wireless communication device 110 may represent an exemplary embodiment of a user equipment and the second wireless communication device 150 may represent an exemplary embodiment of a second user equipment or a base station within a cellular communications network.

The first wireless communication device 110 transmits a first wireless signal 115 toward the second wireless communication device 150 using any acceptable modulation scheme. The second wireless communication device 150 receives the first wireless signal 115. The second wireless communication device 150 processes the received first communication signal and, if necessary, transmits a second wireless signal 155 back to the first wireless communication device 110. In this manner, the first wireless communication device 110 and the second wireless communication device 150 exchange information ("communicate") with one another.

An Exemplary Wireless Communication Device

Figure 2:
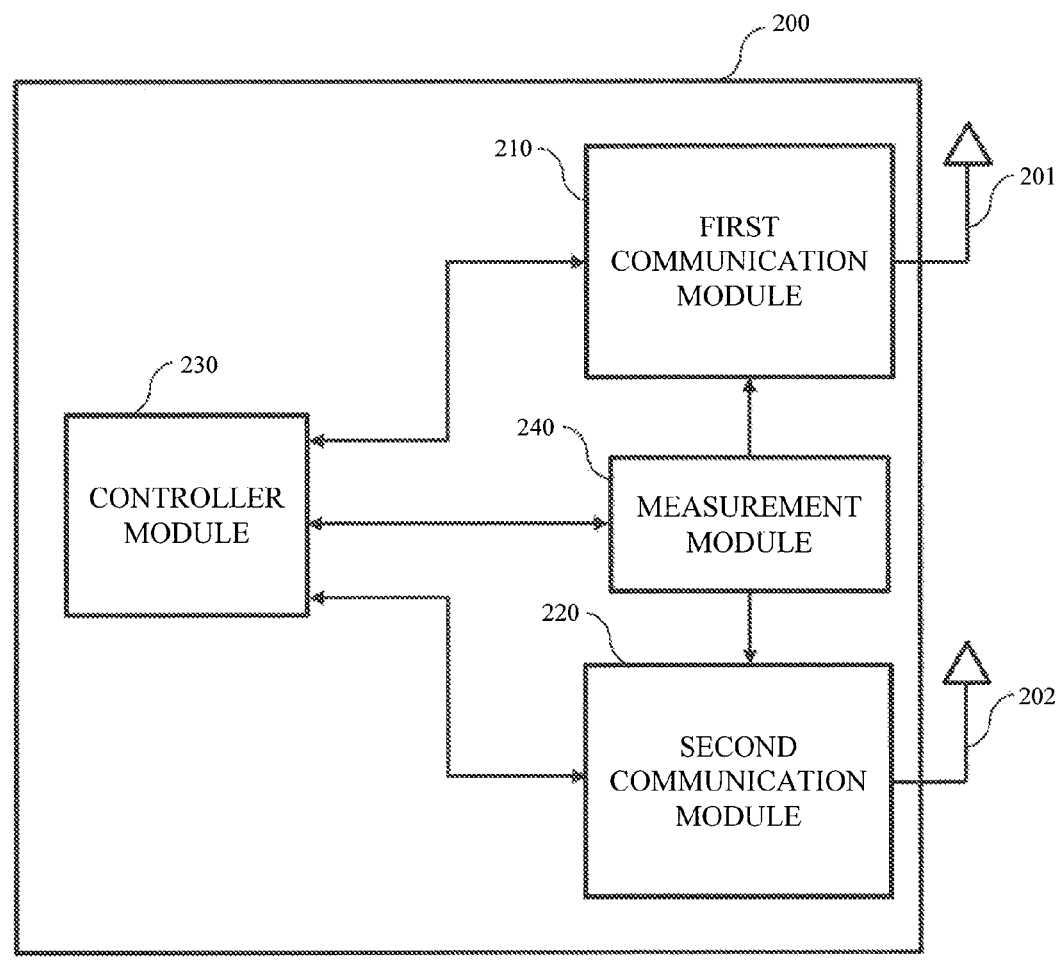
FIG. 2 illustrates a block diagram of a wireless communication device that is implemented as part of the wireless communication environment according to an exemplary embodiment of the invention.

FIG. 2 illustrates a block diagram of a wireless communication device 200 that is implemented as part of the wireless communication environment 100 according to an exemplary embodiment of the invention. The wireless communication device 200 includes a first communication module 210 and a second communication module 220, and may represent an exemplary embodiment of the first wireless communication device 110 or the second wireless communication device 150.

The wireless communication device 200 includes a controller module 230 that performs most of the functions within the wireless communication device 200, including background processing, signal processing, and control. The controller module 230 is connected to each of the first communication module 210 and the second communication module 220. The first communication module 210 receives signals from, and transmits signals to, the wireless communication environment 100 via an antenna 201. The first communication module 210 may include a first receiver chain for individually receiving and front-end processing signals. The second communication module 220 receives signals from, and transmits signals to, the wireless communication environment 100 via an antenna 202. The second communication module 220 may include a second receiver chain for individually receiving and front-end processing signals.

Upon receipt of signals from the wireless communication environment 100, the first communication module 210 and the second communication module 220 perform front-end processing on the received signals and forward the received signals to the controller module 230. The front-end processing may include down-conversion, demodulation and decoding, among other processings. The controller module 230 may also control the operation of, and generate signals for transmission by, one or more of the first communication module 210 and the second communication module 220.

Depending on the current RAT, the wireless communication device may use one or both of the first communication module 210 and the second communication module 220 for communication. For example, a typical 4G communication requires at least two antennas and receive chains, whereas a typical 2G communication requires the use of only a single antenna/receive chain. Accordingly, when communicating in 4G, the controller module 230 controls both the first communication module 210 and the second communication module 220 to receive signals from the wireless communication environment 100. Alternatively, when communicating in 2G, the controller module 230 controls only the first communication module 210 to receive signals from the wireless communication environment 100.

During communication, it is necessary to perform measurements on both the current RAT and on secondary (alternative) RATs. From the measurements, the wireless communication device 200 is able to optimize communication by either adjusting modulation/coding schemes on the current RAT, or by initiating a handover to an alternative RAT. In order to control the measurements by the first communication module 210 and/or the second communication module 220, the wireless communication device 200 further includes a measurement module 240. The measurement module 240 receives commands from the controller module 230 regarding whether to initiate a measurement, and may be capable of requesting and detecting measurement gaps, as will be discussed in further detail below.

Figure 3A:
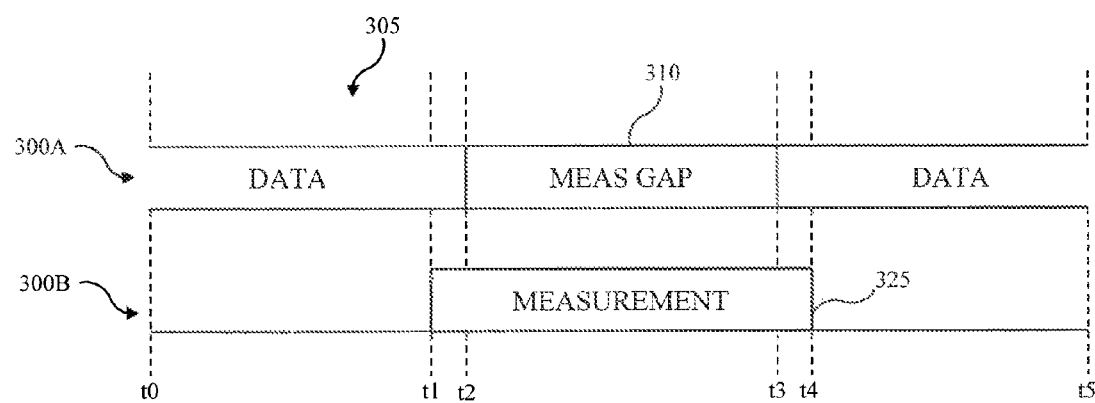
FIG. 3A illustrates a measurement timing configuration that may be implemented by the wireless communication device according to an exemplary embodiment of the invention.

Exemplary Device Configurations for Measuring Alternative Radio Access Technologies Measure Overlapping with Measurement Gap FIG. 3A illustrates a measurement timing configuration that may be implemented by the wireless communication device 200 according to an exemplary embodiment of the invention.

As discussed above, devices that are capable of communicating over multiple RATs suffer performance complications when attempting to perform measurements on a RAT whose measurement time exceeds the allocated measurement gap time for the current RAT. This typically occurs when communicating on a single-antenna RAT, such as 2G.

FIG. 3A shows a communication timing 300A for the first communication module 210 and a measurement timing 300B for the second communication module 220 on which a measurement 325 is to be performed for the alternative RAT. Each of the first communication module 210 and the second communication module 220 may be capable of communicating using the same or different RATs. The communication timing 300A includes a communication link 305 with another wireless communication device, and implements a measurement gap 310 in between data transfers. As shown in FIG. 3A, the duration of the measurement 325 (time t1-t4) exceeds the amount of time allocated for the measurement gap 310 (time t2-t3) for the current RAT.

In this scenario, the controller module 230 instructs the measurement module 240 to perform a measurement. After receiving the measurement instruction from the controller module 230, the measurement module 240 causes the first communication module 210 and/or the second communication module 220 to request a measurement gap from the wireless communication device with which the wireless communication device 200 is currently communicating (e.g. a base station). The communication module that makes the request for the measurement gap 310 is preferably the communication module communicating on the current RAT.

At time t0, the first communication module 210 is communicating with another wireless communication device using the current RAT. In anticipation of the approaching measurement gap 310, and because the current RAT only requires a single communication module for operation, the measurement module 240 controls the second communication module 220 to begin performing its measurement 325 of the secondary RAT at time t1. At time t2, the first communication module 210 ends data communication, and begins the measurement gap 310. The measurement gap 310 ends at time t3, at which time the first communication module 210 resumes data communication. At time t4, the measurement 325 concludes.

It should be understood that the measurement 325 can encompass one or more of measuring channel conditions of the measured RAT (such as CINR, RSSI, etc.), and acquiring system information of the measured RAT (such as time offset, system frame number, etc.). However, when performed during a measurement gap (as in FIG. 3A), the measurement 325 typically will be used for measuring channel conditions.

This measurement timing configuration provides numerous advantages over current related art devices. Specifically, the measurement module 240 causes the measurement 325 to be performed by only one of the communication modules, namely the communications module that is unused by current RAT. In this manner, communication on the current RAT proceeds uninterrupted, and without discarding communication data to perform the measurement for secondary RAT. In other words, even though the measurement 325 exceeds the measurement gap 310 in duration, it is not necessary to sacrifice data to perform the measurement 325. In addition, by scheduling the measurement 325 to at least overlap with the measurement gap 325, the negative effects on the current communication by the measurement 325 are minimized. Specifically, performing the measurement 325 while attempting to also communicate over the current RAT can inject undesired noise and interference into the signals received on the current RAT. By overlapping with the measurement gap, the injected noise and interference is significantly reduced.

Those skilled in the relevant art(s) will recognize that many modifications may be available to the wireless communication device 200 and/or the measurement timing configuration within the spirit and scope of the present invention. For example, the measurement 325 may be scheduled to start at the beginning of the measurement gap 305 (time t2) rather than in anticipation of the measurement gap 305 (time t1), or may be schedule so as to only partially overlap with the measurement gap 305 depending on the application.

Measure Outside Measurement Gap

Figure 3B:
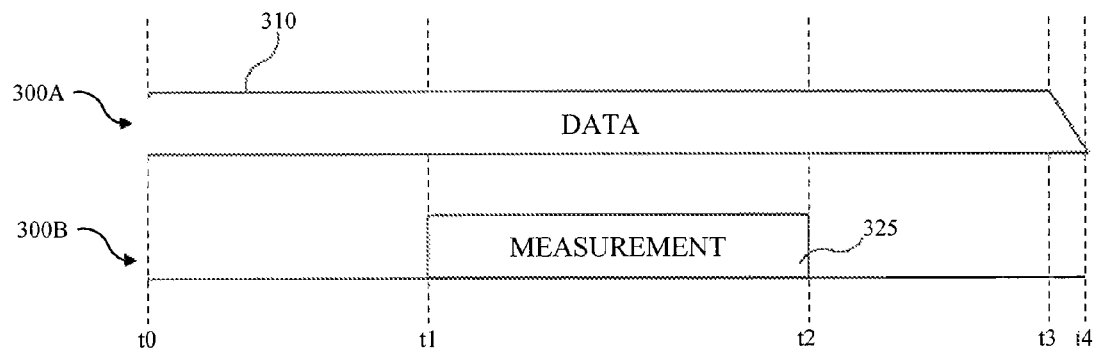
FIG. 3B illustrates a measurement timing configuration that may be implemented by the wireless communication device according to an exemplary embodiment of the invention.

FIG. 3B illustrates a measurement timing configuration that may be implemented by the wireless communication device 200 according to an exemplary embodiment of the invention.

As discussed above, measurements of the alternative RAT should typically be performed during a measurement gap in order to avoid injecting undesired amounts of noise and interference into current RAT incoming signals. However, under certain circumstances, it may be desirable to perform a measurement 325 regardless of whether a measurement gap has been received.

One such scenario is in preparation for handing over to a secondary RAT. Specifically, after performing certain analyses of the current RAT and the secondary RAT, the controller module 230 of the wireless communication device 200 may determine that communication should be handed over from the current RAT to the secondary RAT. This typically occurs when conditions on the secondary RAT exceed those on the current RAT such that handing off will enhance communication quality.

Once the decision has been made to hand off to the secondary RAT, the controller module 230 instructs the measurement module 240 to perform a measurement 325. The controller module 230 also identifies the measurement 325 as being "high priority." This may be performed simply by setting a priority flag within a control signal to the measurement module, or by any other means that is now or will be known.

After receiving the instruction to perform the high-priority measurement, the measurement module 240 does not request or wait for a measurement gap, but rather causes the second communication module 220 to immediately (or with minimal delay) perform the measurement of the secondary RAT, as illustrated in FIG. 3B.

FIG. 3B shows that, at time t0, the first communication module 210 is communicating over the current RAT. At, or slightly prior to time t1, the measurement module 240 receives the instruction to perform the high-priority measurement 325. At time t1, the measurement module 240 causes the second communication module 220 to perform the measurement 325 regardless of whether first communication module 210 has received a measurement gap. The measurement module 240 preferably causes the measurement 325 to be performed with minimal delay from the time the measurement instruction is received. At time t2, the measurement 325 concludes. Presuming that the high-priority measurement was requested in anticipation of an inter-RAT handoff, at a later time t3, the controller module 230 initiates the handoff and at time t4, the communication 310 on the current RAT concludes. At this time, communication on the alternative RAT can begin.

As discussed above, it should be understood that the measurement 325 can encompass one or more of measuring channel conditions of the measured RAT (such as CINR, RSSI, etc.), and acquiring system information of the measured RAT (such as time offset, system frame number, etc.). However, when performed in preparation of a handoff (as in FIG. 3B), the measurement 325 typically will be used for obtaining system information of the target RAT.

This measurement configuration also has many advantages over current related art devices. Specifically, in typical devices, all measurements for a handoff must be made after conclusion of communication on the current RAT. This significantly increases handoff latency, as the measurement 325 would not have begun until time t4 in the timeline shown in FIG. 3B. By performing the measurement 325 during the communication 310 on the current RAT, handoff latency can be significantly reduced. In addition, because the high-priority measurement 325 is performed in anticipation of a handoff, the controller module 230 has already determined that the conditions on the current RAT are undesirable. As a result, any noise injected by performing the measurement 325 during the communication 310 is unlikely to have a substantial impact on current communication. In other words, the current RAT is presumably already noisy, and the injection of additional noise is unlikely to have a significant effect on signal quality.

In addition to the possible injection of noise into the current RAT, there is a possibility that measurements taken outside the measurement gap will be underestimated either because the current RAT radio is ON and/or because the current RAT is transmitting signals while the new RAT is being measured. However, this underestimation can be accurately compensated by characterizing the impact of the leakages as part of the initial calibration.

Those skilled in the relevant art(s) will recognize that many modifications may be available to the above measurement timing configuration within the spirit and scope of the present invention. For example, the measurement module 240 may wait a predetermined period of time for a measurement gap before performing the high-priority measurement 325. Alternatively, the high-priority measurement 325 may be performed so as to overlap with the conclusion of the communication on the current RAT. This configuration still reduces handover latency, but to a lesser extent, and further reduces negative effects caused by performing the measurement during current RAT communications.

Choosing Communication Chain to Perform Measurement

As discussed above, when the controller module 230 determines that a measurement of an alternative RAT is needed, the controller module 230 instructs the measurement module 240 accordingly. The measurement module 240 then controls one of the first communication module 210 or the second communication module 220 to perform the measurement. However, while one of the first communication module 210 and the second communication module 220 performs the measurement, the other maintains communication on the current RAT. Consequently, the wireless communication device 200 must select the communication module that will perform the measurement, which is discussed in detail below.

In a first configuration, when a measurement is to be taken, the measurement module 240 causes the first communication module 210 and the second communication module 220 to alternate measuring the alternative RAT with a predetermined periodicity. For example, the first communication module 210 and the second communication module 220 may switch measurement responsibilities within a single measurement, on a measurement-by-measurement basis, or after a predetermined number of measurements. In this manner, the wireless communication device 200 is capable of receiving measurements from each of the first communication module 210 and the second communication module 220 for higher measurement accuracy.

In a second configuration, the controller module 230 maintains communication characteristics of the first communication module 210 and the second communication module 220 with respect to the current RAT. For example, the controller module 230 may track communication quality of the first communication module 210 and the second communication module 220 with respect to the current RAT. The communication quality may be measured based on various characteristics of the communication modules, including SINR (signal to interference-plus-noise ratio), CINR (carrier to interference-plus-noise ratio), or RSSI (received signal strength indication) of received signals, as well as any other signal strength determination method that is now or will be known. At the time of the measurement, the controller module 230 also indicates to the measurement module 240 the communication module having the best current-RAT characteristics. The measurement module 240 then controls the stronger communication module to maintain communication on the current RAT, and controls the weaker communication module to perform the measurement.

For example, the controller module 230 may determine that the first communication module 210 has stronger current-RAT communication characteristics than the second communication module 220. The controller module 230 then instructs the measurement module 240 to perform a measurement, and informs the measurement module 240 that the first communication module 210 has the stronger current-RAT communication characteristics. The measurement module 240 then controls the second communication module 220 to perform the desired measurement of the alternative RAT, while controlling the first communication module 210 to continue current-RAT communication.

With this configuration, the wireless communication device 200 maintains its strongest current-RAT communication link. As a result, the measurement minimally affects current communications by the wireless communication device 200.

Those skilled in the relevant art(s) will recognize that many modifications may be made to the above configurations, and that alternative configurations may be available within the spirit and scope of the present invention. For example, the measurement module 240 can randomly select the communication module to perform the measurement. In addition, those skilled in the relevant art(s) will understand that the above configurations can be expanded to more than two communication modules, and can be used together in the same wireless communication device.

Figure 4:
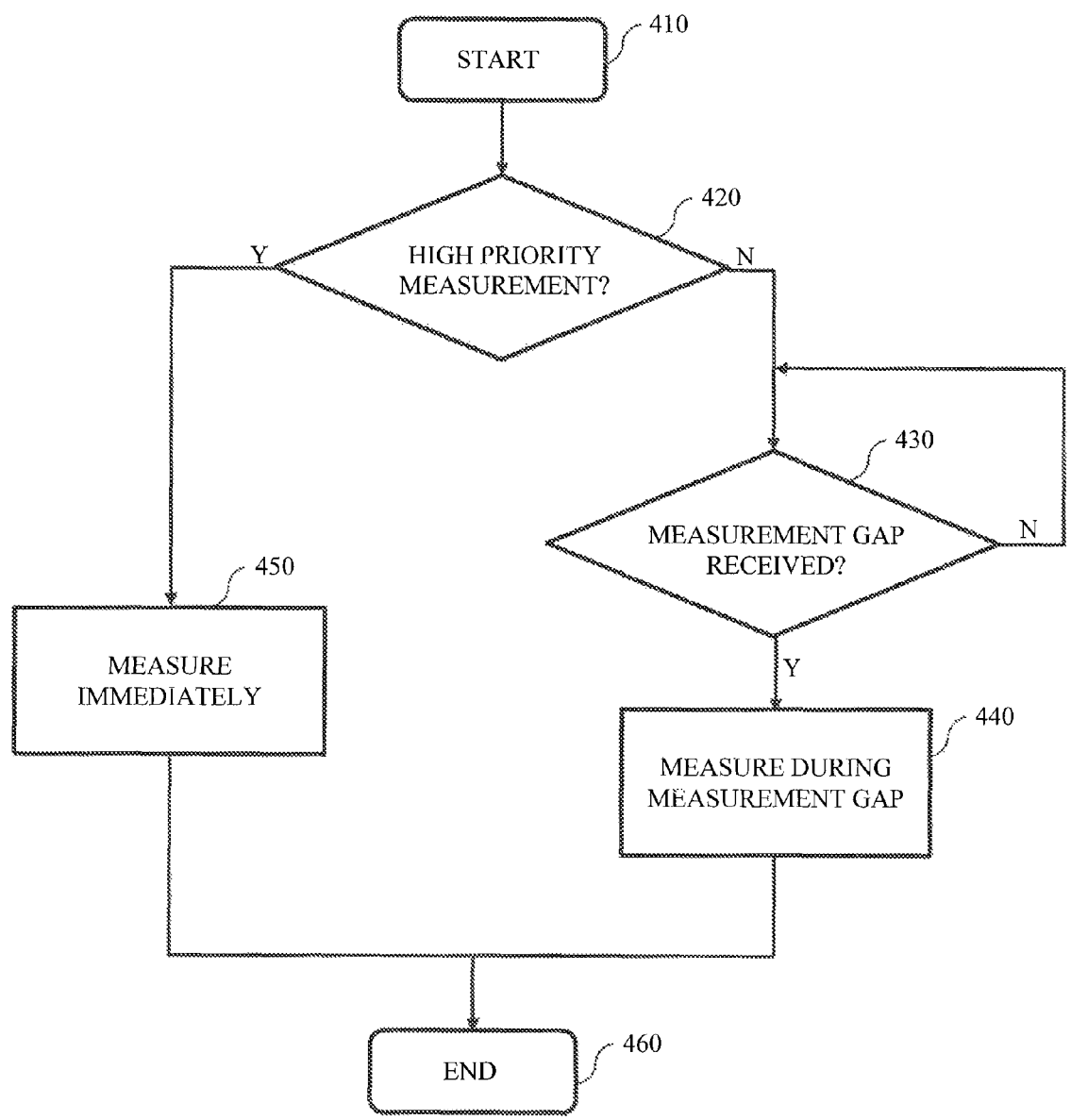
FIG. 4 illustrates a block diagram of a method for performing a measurement of a secondary RAT within a wireless communication device according to an exemplary embodiment of the invention.

An Exemplary Method for Performing a Measurement of an Alternative Radio Access Technology in a Wireless Communication Device FIG. 4 illustrates a block diagram of a method for performing a measurement of an alternative RAT (a RAT not currently used for communication) in a wireless communication device. The wireless communication device preferably includes at least a first communication module and a second communication module.

The method begins at step 410, where the wireless communication device initiates a measurement of the alternative RAT. The method then proceeds to step 420. In step 420, the wireless communication device determines whether the measurement is a high-priority measurement.

If the measurement is not high-priority, the method proceeds to step 430. In step 430, the wireless communication device determines whether a measurement gap has been received. If no measurement gap has been received, the method returns to step 430. If a measurement gap has been received, the method proceeds to step 440. In step 440, the wireless communication device performs a measurement of the alternative RAT using at least one of the first communication module and the second communication module during a period of time that overlaps with the measurement gap. The method then proceeds to step 460, where the method ends.

Alternatively, if the measurement is high-priority, the method proceeds to step 430. In step 430, the wireless communication device performs the measurement of the alternative RAT immediately (with minimal delay), and without waiting for a measurement gap. The method then proceeds to step 460, where the method ends.

Those skilled in the relevant art(s) will recognize that the method can additionally or alternatively include any of the functionality of the wireless communication device 200 discussed above, and the above description of the exemplary method should neither be construed to limit the method nor the description of the wireless communication device 200.

Conclusion

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. A wireless communication device, comprising:
a first communication module configured to communicate with another wireless communication device using a first radio access technology (RAT); and
a second communication module configured to perform a measurement of a second RAT during a second RAT measurement interval that overlaps with a first RAT measurement gap, the second RAT measurement interval having a duration that is different from a duration of the first RAT measurement gap,
wherein the first communication module is configured to maintain a first RAT communication link with the other wireless communication device during the measurement of the second RAT, and
wherein the second RAT measurement interval begins during the first RAT measurement gap, and ends after the first RAT measurement gap.

2. The wireless communication device of claim 1, wherein the first RAT measurement gap corresponds to a temporary break in first RAT communication so that a measurement of the first RAT can be performed.

3. A wireless communication device, comprising:
a first communication module configured to communicate with another wireless communication device using a first radio access technology (RAT);
a second communication module configured to perform a measurement of a second RAT during a second RAT measurement interval that overlaps with a first RAT measurement gap, the second RAT measurement interval having a duration that is different from a duration of the first RAT measurement gaps; and
a controller module configured to set a priority of the measurement as either normal priority or high-priority,
wherein the first communication module is configured to maintain a first RAT communication link with the other wireless communication device during the measurement of the second RAT.

4. The wireless communication device of claim 3, wherein the second communication module is configured to schedule the second RAT measurement interval based on the priority set by the controller module, and
wherein the second communication module is configured to schedule the second RAT measurement interval so as to overlap with the first RAT measurement gap when the controller module sets the measurement as normal priority.

5. The wireless communication device of claim 4, wherein the second communication module is configured to schedule the second RAT measurement interval regardless of whether the first RAT measurement gap exists or whether the second RAT measurement interval overlaps the first RAT measurement gap when the controller module sets the measurement as high-priority.

6. The wireless communication device of claim 5, wherein the controller module is configured to set the priority of the measurement as high-priority when the measurement is to be performed in anticipation of a handoff.

7. A wireless communication device, comprising:
- a first communication module configured to communicate using a first radio access technology (RAT), and to perform a measurement of a second RAT;
- a second communication module configured to communicate using the first RAT, and to also perform the measurement of the second RAT; and
- a measurement module configured to select one of the first communication module or the second communication module to perform the measurement of the second RAT during a second RAT measurement interval that overlaps with a first RAT measurement gap, the second RAT measurement interval having a duration that is different from a duration of the first RAT measurement gap,
- wherein the second RAT measurement interval being before the first RAT measurement gap, and ends after the first RAT measurement gap.

8. The wireless communication device of claim 7, wherein the measurement module is configured to switch between selecting the first communication module and selecting the second communication module with a predetermined periodicity.

9. The wireless communication device of claim 7, wherein the measurement module is configured to select the first communication module to perform the measurement when a most recent previous measurement was performed by the second communication module, and is configured to select the second communication module to perform the measurement when the most recent previous measurement was performed by the first communication module.

10. The wireless communication device of claim 7, wherein the measurement module is configured to randomly select one of the first communication module or the second communication module to perform the measurement.

11. The wireless communication device of claim 7, further comprising a controller module configured to determine which of the first communication module or the second communication module has poorer first-RAT communication, and
- wherein the measurement module is configured to select the communication module determined by the controller module to have the poorer first-RAT communication.

12. A method for performing a measurement of a second radio access technology (RAT) in a wireless communication device currently communicating using a first RAT, the method comprising:
- determining a priority of a measurement to be performed of the second RAT; and
- performing the measurement of the second RAT during a second RAT measurement interval that overlaps with a first RAT measurement gap, the second RAT measurement interval having a duration that is different from a duration of the first RAT measurement gap,
- wherein the second RAT measurement interval begins before the first RAT measurement gap, and ends during the first RAT measurement gap.

13. The method of claim 12, further comprising receiving the first RAT measurement gap from a serving base station.

14. The method of claim 12, wherein when the measurement is determined to be high-priority, then the second RAT measurement interval begins immediately, and
- wherein when the measurement is determined not to be high-priority, then the second RAT measurement interval is scheduled so as to overlap the first RAT measurement gap.

* * * * *

UNITED STATES PATENT AND TRADEMARK OFFICE
CERTIFICATE OF CORRECTION

PATENT NO.        : 8,855,641 B2                                     Page 1 of 1
APPLICATION NO.   : 13/341686
DATED             : October 7, 2014
INVENTOR(S)       : Kumar Reddy et al.

It is certified that error appears in the above-identified patent and that said Letters Patent is hereby corrected as shown below:

In the Claims,
Column 11, line 24, please replace "being" with --begins--.

Signed and Sealed this
Twenty-fourth Day of February, 2015

Michelle K. Lee
*Deputy Director of the United States Patent and Trademark Office*